(12) United States Patent
Perkin et al.

(10) Patent No.: US 7,887,271 B2
(45) Date of Patent: Feb. 15, 2011

(54) APPARATUS FOR CUTTING AN INTERNAL BORE

(75) Inventors: Gregg Steven Perkin, Kingwood, TX (US); John Hadjioannou, Spring, TX (US); Keven Michael O'Connor, Houston, TX (US)

(73) Assignee: Engineering Partners International, Incorporated, Kingwood (Houston), TX (US)

( * ) Notice: Subject to any disclaimer, the term of this patent is extended or adjusted under 35 U.S.C. 154(b) by 822 days.

(21) Appl. No.: 11/678,372

(22) Filed: Feb. 23, 2007

(65) Prior Publication Data

US 2007/0145131 A1 Jun. 28, 2007

Related U.S. Application Data

(63) Continuation-in-part of application No. 11/318,772, filed on Dec. 27, 2005, now abandoned.

(51) Int. Cl.
*B23B 45/14* (2006.01)
(52) U.S. Cl. .......... 409/143; 408/79; 408/128
(58) Field of Classification Search ........ 408/79, 408/99–101, 103, 110–112, 128, 129, 137, 408/87, 141; 409/143, 144, 175, 177, 185
See application file for complete search history.

(56) References Cited

U.S. PATENT DOCUMENTS

| | | | | |
|---|---|---|---|---|
| 757,734 A | * | 4/1904 | Gadfield | 408/114 |
| 924,473 A | * | 6/1909 | Kindleberger et al. | 408/111 |
| 960,097 A | * | 5/1910 | Keithley et al. | 408/79 |
| 976,635 A | * | 11/1910 | Cobb | 408/79 |
| 1,002,153 A | * | 8/1911 | Jam | 166/55.2 |
| 1,114,373 A | * | 10/1914 | Lane | 408/110 |
| 1,127,011 A | * | 2/1915 | Kafader | 166/55.3 |
| 1,705,384 A | * | 3/1929 | Wikander | 408/137 |
| 4,419,032 A | * | 12/1983 | Flowers | 408/112 |
| 4,890,962 A | * | 1/1990 | Nydegger | 408/14 |
| 5,352,070 A | * | 10/1994 | Tehrani | 408/102 |
| 5,527,169 A | * | 6/1996 | Goldenberg et al. | 425/11 |
| 5,626,445 A | * | 5/1997 | Nachbar et al. | 408/1 R |

FOREIGN PATENT DOCUMENTS

DE 3834998 A1 * 4/1990

* cited by examiner

*Primary Examiner*—Daniel W Howell
(74) *Attorney, Agent, or Firm*—Tomlinson Rust McKinstry Grable

(57) ABSTRACT

A trans-axial cutting apparatus used for cutting an inner surface of an opening formed within an object and accessible from outside the object. The apparatus comprises an elongate portable frame. The frame supports a cutting member on the first side and a stabilizing member on the second side. The stabilizing member is adapted to secure the apparatus during operation of the cutting member. The apparatus may be used to cut a counter bore, a longitudinal slot or groove at a desired depth, a helical slot or groove at a desired depth, or a slot or groove at a desired depth and along a desired path within the opening. Additionally, the apparatus is adapted to make any of the preceding cuts in a tapered or stepped manner within the opening of the object.

29 Claims, 9 Drawing Sheets

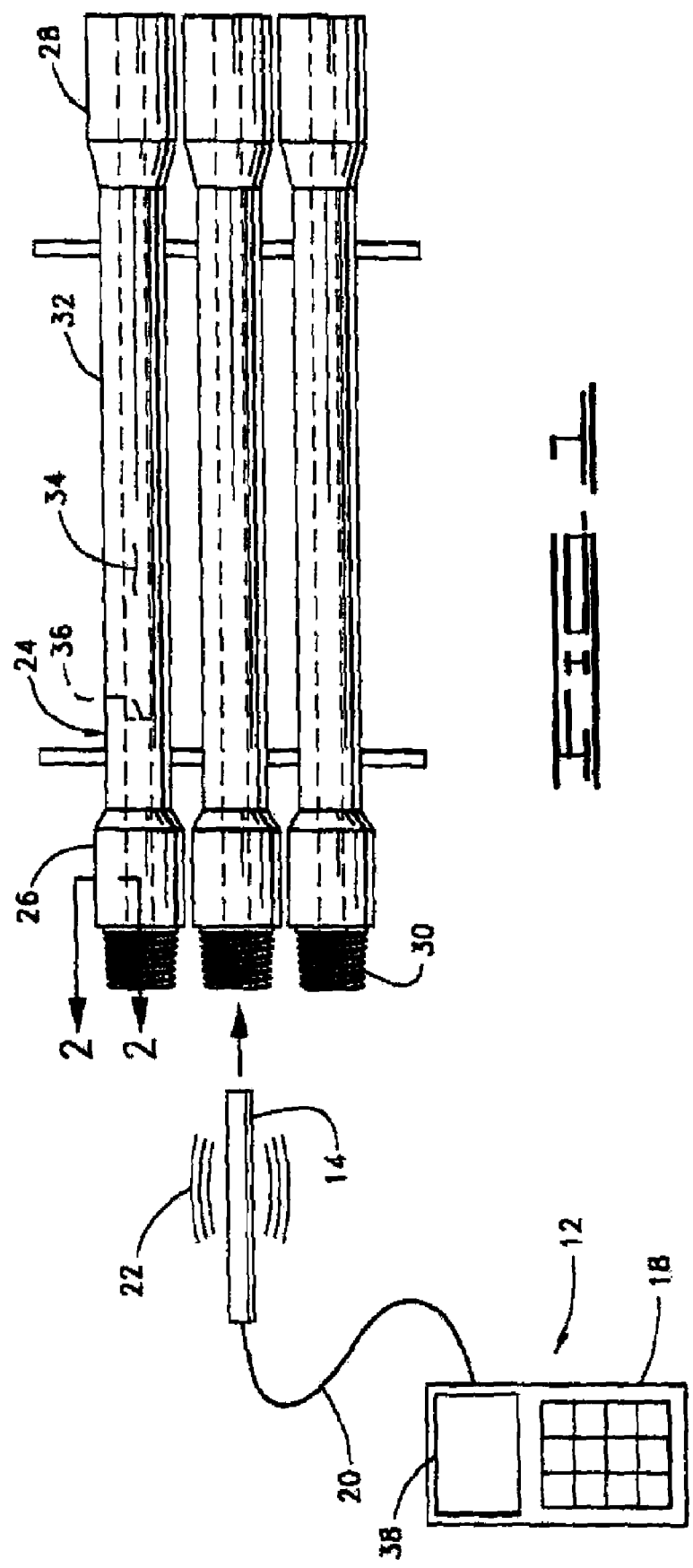

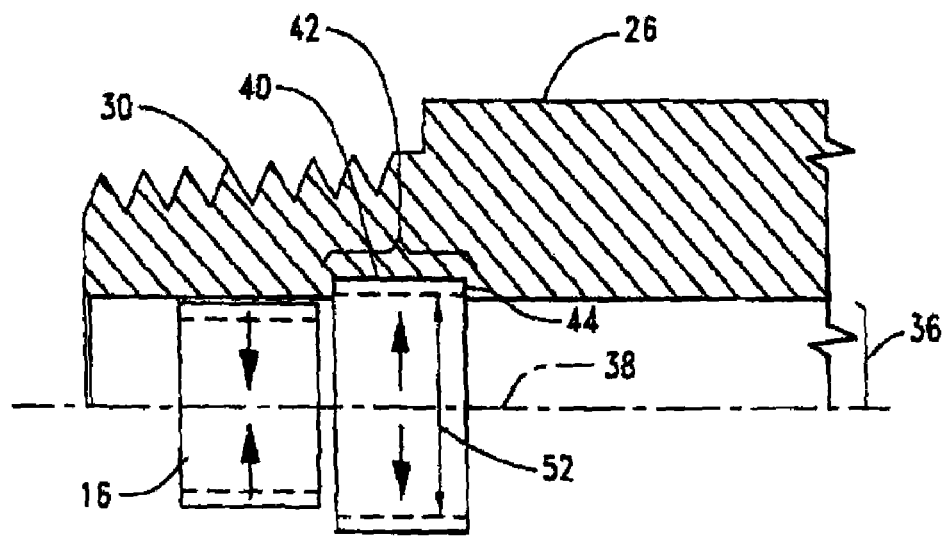
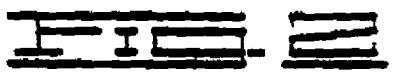
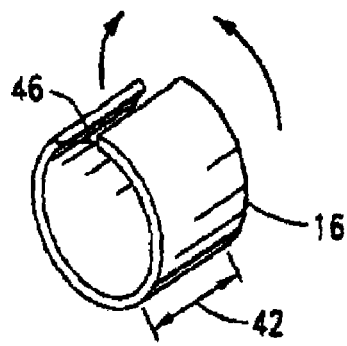
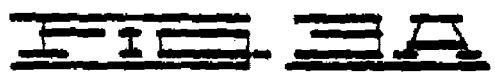
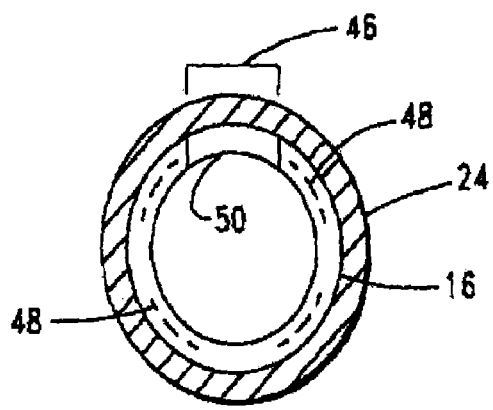
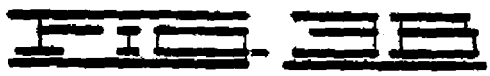

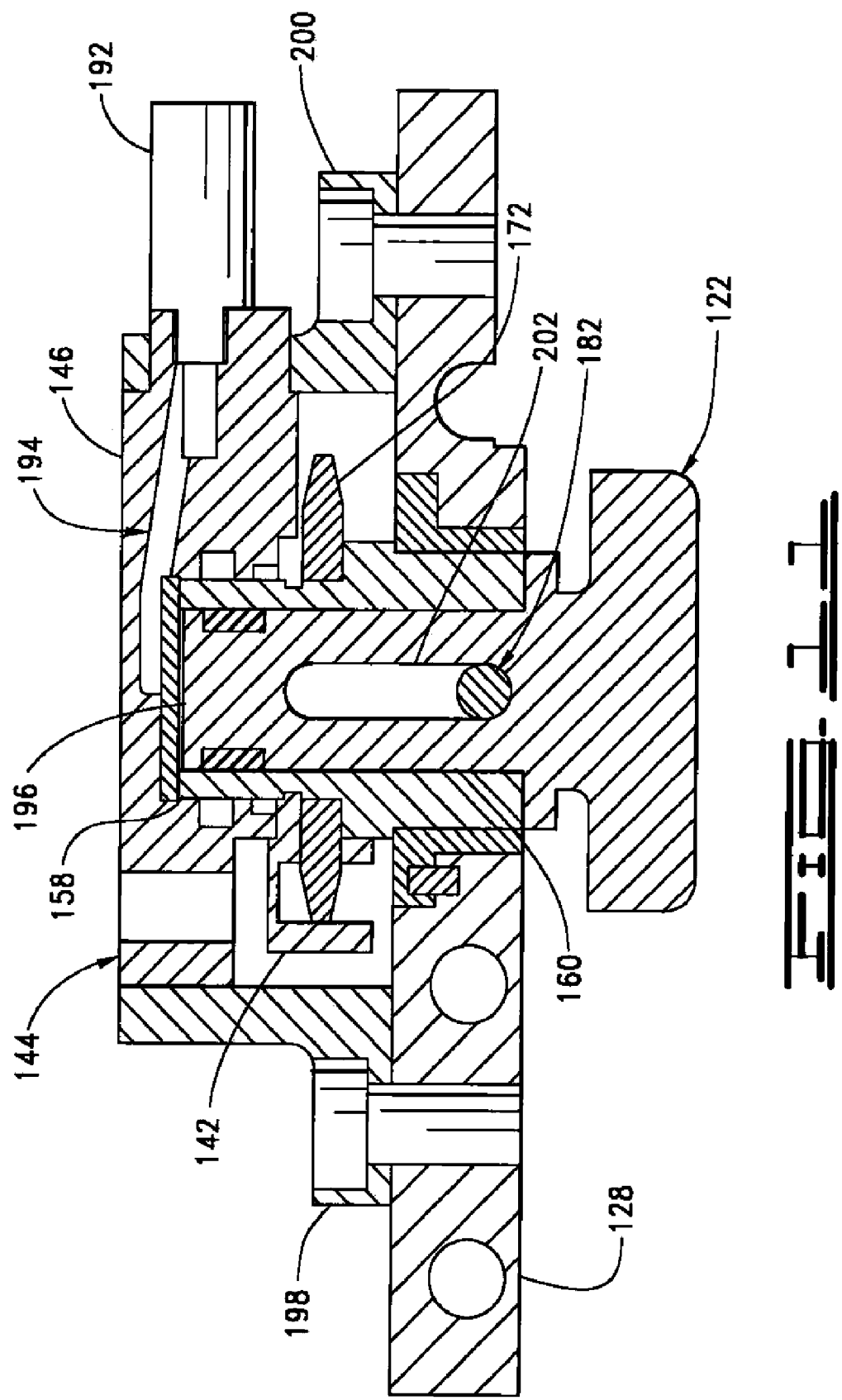

US 7,887,271 B2

APPARATUS FOR CUTTING AN INTERNAL BORE

CROSS REFERENCE TO RELATED APPLICATIONS

This application is a continuation-in-part of abandoned U.S. patent application Ser. No. 11/318,772 filed Dec. 27, 2005.

FIELD OF THE INVENTION

The present invention relates generally to the field of boring or cutting devices, and more specifically to a machine for cutting a bore or groove inside an opening formed in an object and accessible from outside of the object.

SUMMARY OF THE INVENTION

The present invention is directed to an apparatus for cutting an inner surface of an opening formed within an object and accessible from outside the object. The apparatus comprises a portable frame having a first end and a second end, a drive system, a cutting member, a means for transmitting drive power to the cutting member, and a stabilizing member. The drive system is supported proximate to the first end of the frame. The extendable cutting member is mounted on a first side of the frame. The means for transmitting drive power from the drive system to the cutting member drives operation of the cutting member. The stabilizing member is mounted on a second side of the frame. The stabilizing member is adapted to secure the apparatus during operation of the cutting member.

The present invention further includes a cutting apparatus. The cutting apparatus comprises a frame, a drive system, an actuating device, a cutting member, a means for transmitting drive power, and a stabilizing member. The frame comprises a longitudinal axis, a first end, and a second end. The drive system is supported proximate to the first end of the frame. The actuating device is supported at the second end of the frame. The cutting member is operatively connected to the actuating device and movable from a first side of the frame by operation of the actuating device. The means for transmitting drive power transfers drive power from the drive system to the cutting member to drive operation of the cutting member. The stabilizing member is connected to the frame and adapted to secure the apparatus during operation of the actuating device and movement of the cutting member.

Further, the present invention includes an apparatus for cutting a counterbore in an inner wall of an object having an opening accessible from outside the object. The apparatus comprises a frame having a longitudinal axis and a first end and a second end, a drive system, an actuating device, a cutting member, a means for transmitting drive power, and a means for stabilizing. The drive system is supported proximate to the first end of the frame and the actuating device is supported at the second end of the frame. The cutting member is operatively supported by the frame and movable relative to a first side of the frame by operation of the actuating device. The means for transmitting drive power transmits drive power from the drive system to the cutting member to drive operation of the cutting member. The means for stabilizing functions to stabilize the apparatus within the opening during operation of the cutting member supported on the frame.

DESCRIPTION OF THE FIGURES

FIG. 1 is diagrammatic representation of a portable receiver having an antenna and a hand-held receiver housing. The antenna is shown configured for insertion into the internal passages of a tubular asset.

FIG. 2 is a partial sectional view of the tubular asset shown in FIG. 1. The tubular asset of FIG. 2 is shown with a radio frequency identification (hereinafter "RFID") ring disposed within the pin end of the tubular asset.

FIG. 3a is an isometric view of the RFID ring shown in FIG. 2.

FIG. 3b is a cross-sectional view of the RFID ring of FIG. 3a showing a plurality of electronic circuits disposed about the circumference of the ring.

FIG. 11 is a fragmented, sectional view of the internal boring machine of FIG. 7.

DESCRIPTION OF THE INVENTION

Figure 4:
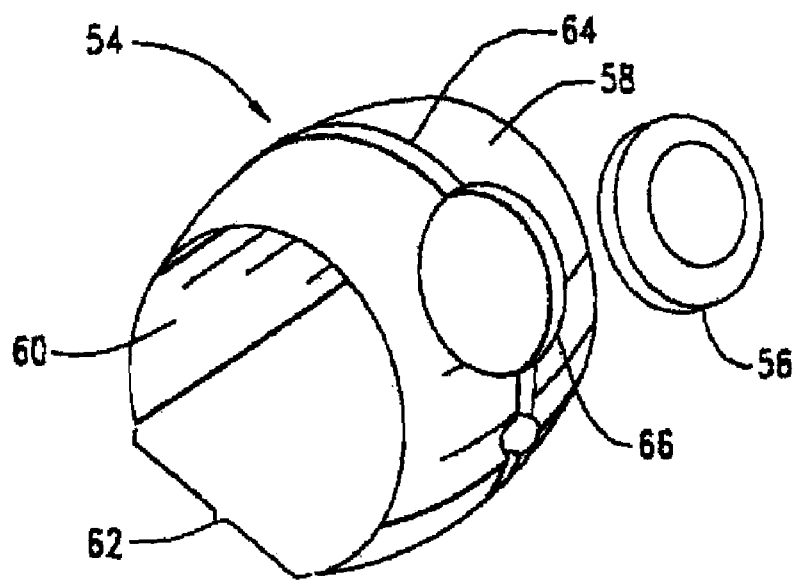
FIG. 4 is an isometric, exploded view of an alternative RFID ring having a circumferential groove and a generally rounded body.

Oilfield development requires the use of several different pieces of equipment related to exploration, development, completion and extraction. This equipment may cost several thousands of dollars to purchase, repair or replace. Accordingly, many pieces of oilfield equipment are used and reused. This equipment, such as drill stem components, drill collars, rotary substitutes, and drill bits, may be placed under extreme amounts of loadings and stresses eventually causing equipment failure. Equipment failure may cause costly delays and loss of this expensive equipment. Thus, the industry has developed methods and systems designed to track the usage and service records of oilfield equipment in an attempt to predict equipment failure. However, there remains a need for improvement.

The system 10 disclosed herein provides an apparatus and method for identifying oilfield equipment and maintaining usage and maintenance records. The system as described herein includes a portable receiver 12 adapted to identify oilfield equipment at or remote from the jobsite. Preferably, the portable receiver comprises a hand-held receiver and antenna adapted to identify tubular assets comprising drill stem components stacked on a pipe rack.

Turning now to the figures and in particular to FIG. 1, there is shown therein the system 10 for identifying oilfield tubular assets. The system 10 comprises the portable receiver 12. The portable receiver 12 comprises an elongate antenna 14 adapted to receive a unique identification code from an RFID ring 16 (FIG. 2). The elongate antenna 14 may be connected to a hand-held receiver housing 18 by a wire 20. However, it will be appreciated that the elongate antenna 14 and housing 18 of the portable receiver 12 may be integrally formed without departing from the spirit of the present invention. The elongate antenna 14 may be adapted to transmit a signal 22 to the RFID ring 16 supported by a drill stem component 24 and to receive the unique identification card from the electronic circuit 16 (FIG. 2).

The drill stem component sections 24 shown in FIG. 1 are preferably tubular having a pin end 26 and a box end 28. The pin end 26 and the box end 28 are correspondingly threaded. The pin end 26 is provided with tapered external threads 30, and the box end 28 is provided with tapered internal threads (not shown). Thus, box end 28 of the drill stem component 24 is connectable to the pin end 26 of a like drill stem component section. Similarly, the pin end 26 is connectable to the box end 28 of a like stem component section 24. The external diameter of the pin end 26 and the box end 28 of the drill stem component 24 may be larger than the external diameter of the central body portion 32 of the drill stem component. An opening 34 comprising an internal passage and having an internal diameter 36 is formed within the drill stem component 24 and extends from the box end 28 to the pin end 26. The internal passage 34 may be used to transport fluids through the drill stem and into a drill hole (not shown).

Continuing with FIG. 1, the portable receiver 12 may comprise the receiver housing 18. The housing 18 may have a display 38 and a keypad 40 for the input of information into the system. The display 38 may comprise a liquid crystal display adapted to display maintenance and usage records.

Turning now to FIG. 2, there is shown therein the pin end 26 of the drill stem component section 24 shown in FIG. 1. As previously discussed, the pin end 26 of the drill stem component section 24 comprises tapered external threads 30 and the inner diameter 36. The pin end 26 shown in FIG. 2 has been sectioned along the longitudinal axis 38 of the drill stem component section 24 and fragmented for ease of illustration. The pin end 26 of the drill stem component section 24 may comprise a groove 40 for maintaining the RFID ring 16 therein. This groove 40 may be cut into the inner diameter 36 of the drill stem component 24 using a cutting device as described with reference to FIGS. 6-11. The cutting device 78 is adapted to cut the groove 40 in the drill stem component 24 equal to the width 42 and depth 44 of the RFID ring 16.

The RFID ring 16 may comprise a split circumferential ring comprised of a flexible material. As shown in FIG. 3a, the RFID ring 16 may comprise a gap 46 that allows for compression of the ring before installation into the drill stem component section 24. An electronic circuit 48 (FIG. 3b) is supported within the RFID ring 16 and adapted to transmit at least a unique identification code. Preferably, the RFID ring 16 may comprise a plurality of electronic circuits 48 disposed circumferentially about the RFID ring also adapted to transmit a unique identification code. One skilled in the art will appreciate that the electronic circuit may comprise a passive circuit similar to that disclosed in U.S. Pat. No. 4,818,855, the contents of which are incorporated herein by reference. The passive circuit is adapted to transmit the unique identification code to the portable receiver 12 in response to being energized by the tuned magnetic field 22 transmitted by the portable receiver antenna 14. The portable receiver 12 receives the unique identification code and accesses a database to allow retrieval of, or input of, usage and status information of the oilfield equipment corresponding to the received identification code. One skilled in the art will further appreciate that the electronic circuit 48 may comprise an active circuit comprising a power source that is activated by reception of the tuned magnetic field 22. The use of an active circuit provides the ability of read/write memory capable of carrying information from jobsite to jobsite on the drill stem component 24 without the need for a central database. For example, the active circuit 48 could store information relating to usage and maintenance. Further, the active circuit 48 having a power source will be capable of transmitting the unique identification code over greater distances than the previously described passive circuit.

Turning now to FIG. 3b, the RFID ring 16 of the present invention is illustrated in cross section. The RFID ring 16 is shown installed within the drill stem component section 24 with the gap 46 filled-in to prevent movement of the installed ring. A filler material 50 such as an epoxy capable of withstanding the harsh downhole environment may be used to fill-in the RFID ring gap 46.

The RFID ring of FIGS. 2-3 may be installed by first cutting away drill stem component material from the inner diameter 36 of the drill stem component section 24 to a depth 44 equal to the thickness of the RFID ring 16. The RFID ring 16 is then compressed so that the gap 46 is closed and the RFID ring is inserted into the pin end 26 of the pipe. The RFID ring 16 is inserted further into the pin end 26 of the drill stem component section 24 until it is inserted into the groove 40. Next, the filler material 50 may be inserted into the REID ring gap 46 to lock the RFID ring 16 into the groove. The RFID ring 16 is installed into the groove 40 so that the inner diameter 52 of the RFID ring is substantially flush with the inner diameter 52 of the tubular asset 24.

Turning now to FIG. 4 there is shown therein an alternative RFID ring 16 comprising an electronic circuit 56. The RFID ring 54 of FIG. 4 may be manufactured from any material capable of withstanding the harsh downhole environment of drilling operations. Such materials may include non-ferrous metals or thermoplastics. The ring 54 comprises a generally rounded upper face 58, a flat lower face 60 and a gap 62. The rounded upper face 58 comprises a circumferential groove 64 adapted for mating engagement with a corresponding lip (not shown) formed in the internal groove 40 cut in the drill stem component section. The gap 62 allows for compression of the RFID ring's 54 diameter so that the ring may be placed within the internal passage 36 (FIG. 2) of the drill stem component section 24. The filler material 50 may be placed within the gap 62 after placement of the RFID ring 54 within the drill stem component 24 to prevent movement of the ring. The circumferential groove 64 also provides a means for preventing slippage or movement of the RFID ring 54 by matingly engaging a lip (not shown) in the groove 40 (FIG. 2) of the pipe section 24 (FIG. 2). The RFID ring 54 also comprises a socket 66 formed for mating engagement with the electronic circuit 56. The electronic circuit 56 may be maintained within the socket 66 using a suitable adhesive or other mechanical means.

Figure 5:
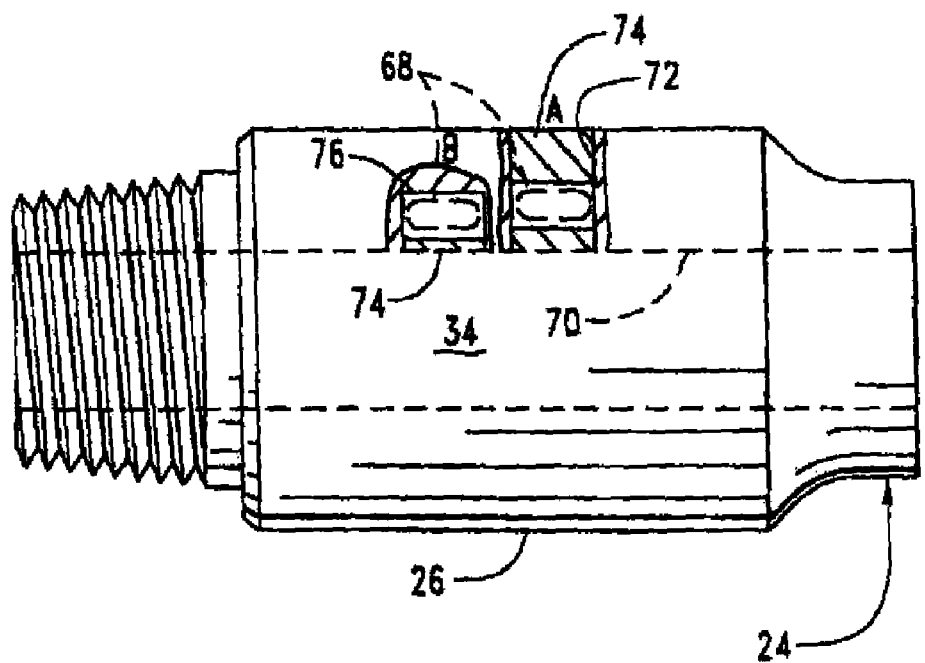
FIG. 5 illustrates two alternative methods of positioning an electronic circuit within the tubular asset. In the first position, the circuit may be placed within a bore drilled from outside the tubular asset. In the second position, the circuit may be placed within a cavity drilled into the internal passage of the tubular asset.

Turning now to FIG. 5 there is shown therein an alternative embodiment of the present invention. The embodiment of FIG. 5 shows the use of an encapsulated electronic circuit 68 supported within the sidewall 70 of the pin end 26 of the drill stem component section 24. The electronic circuit 68 may comprise an encapsulated circuit as taught in U.S. Pat. No. 5,142,128 issued to Perkin et al., the contents of which are incorporated by reference. The electronic circuit 68 is shown in FIG. 5 placed in two alternative positions A and B. In Position A the electronic circuit 68 is shown placed within borehole 72 drilled into the pin end 26 of the drill stem component section 24. The circuits 68 are installed on the interior of the pin end 26 so that the circuits may communicate with the antenna 14 (FIG. 1) of the portable receiver 12 when the antenna is placed within the internal passage 34. The circuit 68 may be retained within the borehole using a retaining ring or other mechanical means and the filler material 74 may be placed in the borehole 72 to seal the hole and secure the circuit 68 within the borehole. In the alternative, the electronic circuit 68 may be placed within a cavity 76 drilled into the pin end 26 of the drill stem component section 24 from the internal passage 34 of the drill stem component. The cavity 76 may be cut into the pin end 26 of the drill stem component section 24 using an internal boring machine 78 illustrated in FIG. 6. The circuit 68 may be placed within the cavity and mechanically retained therein with a retaining ring. The cavity 76 is then sealed using any commercially available sealant or filler material 74. It will be appreciated that several electronic circuits 68 may be placed about the circumference of the internal passage 34 to decrease directional sensitivity.

Figure 6:
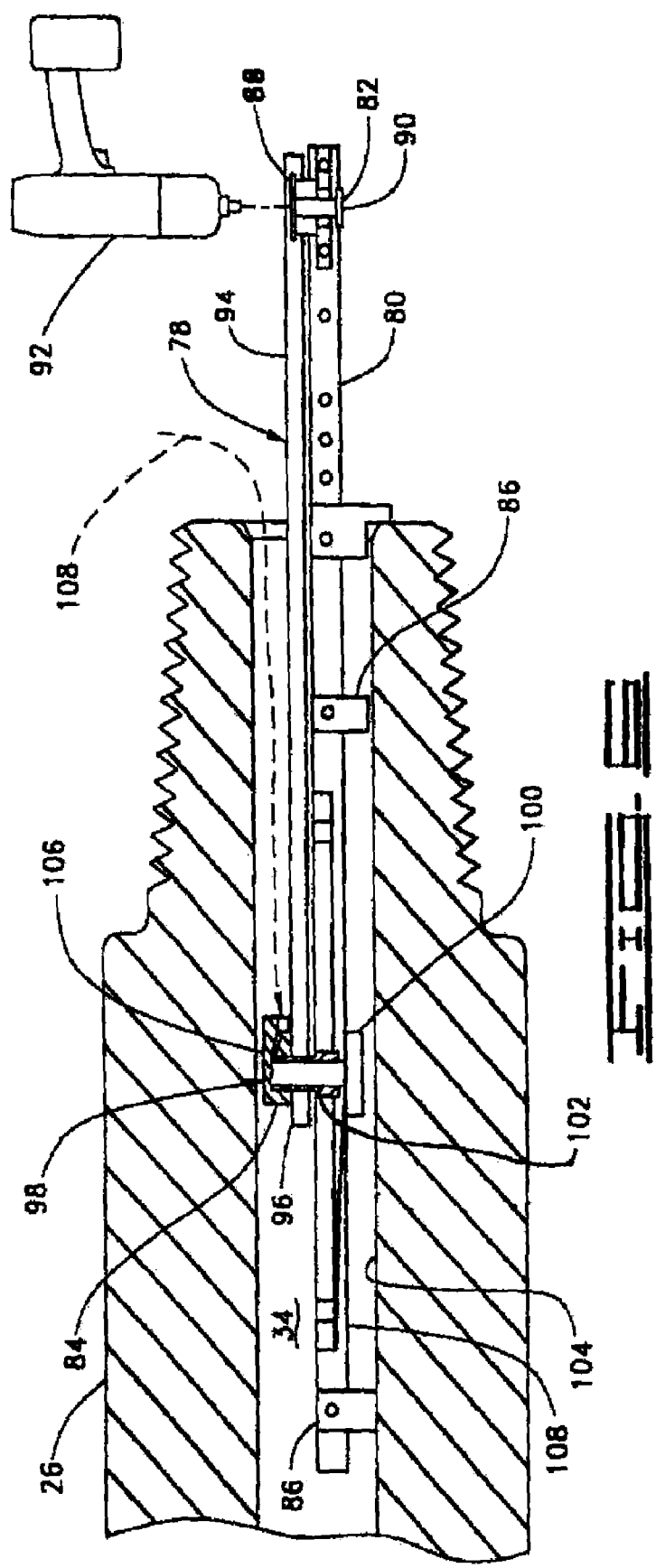
FIG. 6 is a diagrammatic view of an internal boring machine used to create the cavity shown in FIG. 5.

Turning now to FIG. 6, there is shown therein a first embodiment of an internal boring machine 78 adapted to drill a cavity 76 in an opening formed in a piece of oilfield equipment 24. The internal boring machine 78 may be used to drill a counter bore having a predetermined diameter and depth, a hole at a predetermined diameter through the object from inside the opening, a longitudinal slot or groove at a desired depth, a helical slot or groove at a desired depth, or a slot or groove at a desired depth and along a desired path within the opening 34. Additionally, the internal boring machine 78 may cut any of the above in a stepped or tapered manner.

The internal boring machine 78 of FIG. 6 is shown disposed within the internal passage 34 of the pin end of the drill stem component section 24. The boring machine 78 comprises a portable frame 80, a drive system 82 and a cutter assembly 84. The drive system 82 and the cutter assembly 84 are both supported by the frame 80. The frame 80 is generally elongate and comprises support rails disposed in parallel alignment. A plurality of inner diameter stabilizers 86 are disposed between the rails to stabilize the boring machine 78 within the internal passage 34.

The drive system 82 comprises a sprocket 88 having an internal shaft 90 adapted for engagement with the shaft of a commercially available portable drill 92. The drive system sprocket 88 engages a drive chain 94 that is driven in response to rotation of the drive sprocket 88. The drive chain 94, in turn, drives operation of the cutter assembly 84 in a manner described below.

The cutter assembly 84 may comprise a cutter sprocket 96, a stabilizing member 98, and a cutting member 100 having a shaft 102. The cutter sprocket 96 is rotatable in response to movement of the drive chain 94. Rotation of the cutter sprocket 96 drives rotation of the cutting member 100. The cutting member 100 is extendable trans-axially from the frame 80 to engage the surface 104 of the inner diameter of the pipe section 24 in response to a hydraulic fluid pumped into the cutter housing 106. The hydraulic fluid is supplied to the cutter assembly 84 via a hose 108 and extends the cutting member 100 by generating pressure on the shaft 102 of the cutting member 100. As the cutting member 100 is extended from the frame 80, the stabilizing member 98 is forced upward to engage the opposite side of the internal passage 34. The force placed on the internal passage 34 by the cutting member 100 and the stabilizing member 98 holds the machine in place during operation. The hydraulic pressure generated within the cutter assembly housing 106 continues to force the cutting member 100 axially from the frame 80 as the drilling operation proceeds. After the cavity or groove has been cut in the internal passage 34, the hydraulic fluid is drained from the cutter assembly 84 and the cutting member 100 retracts under the force of a leaf spring 108. The boring machine 78 may be removed from the drill stem component 24 after the cutting member 100 is retracted.

Figure 7:
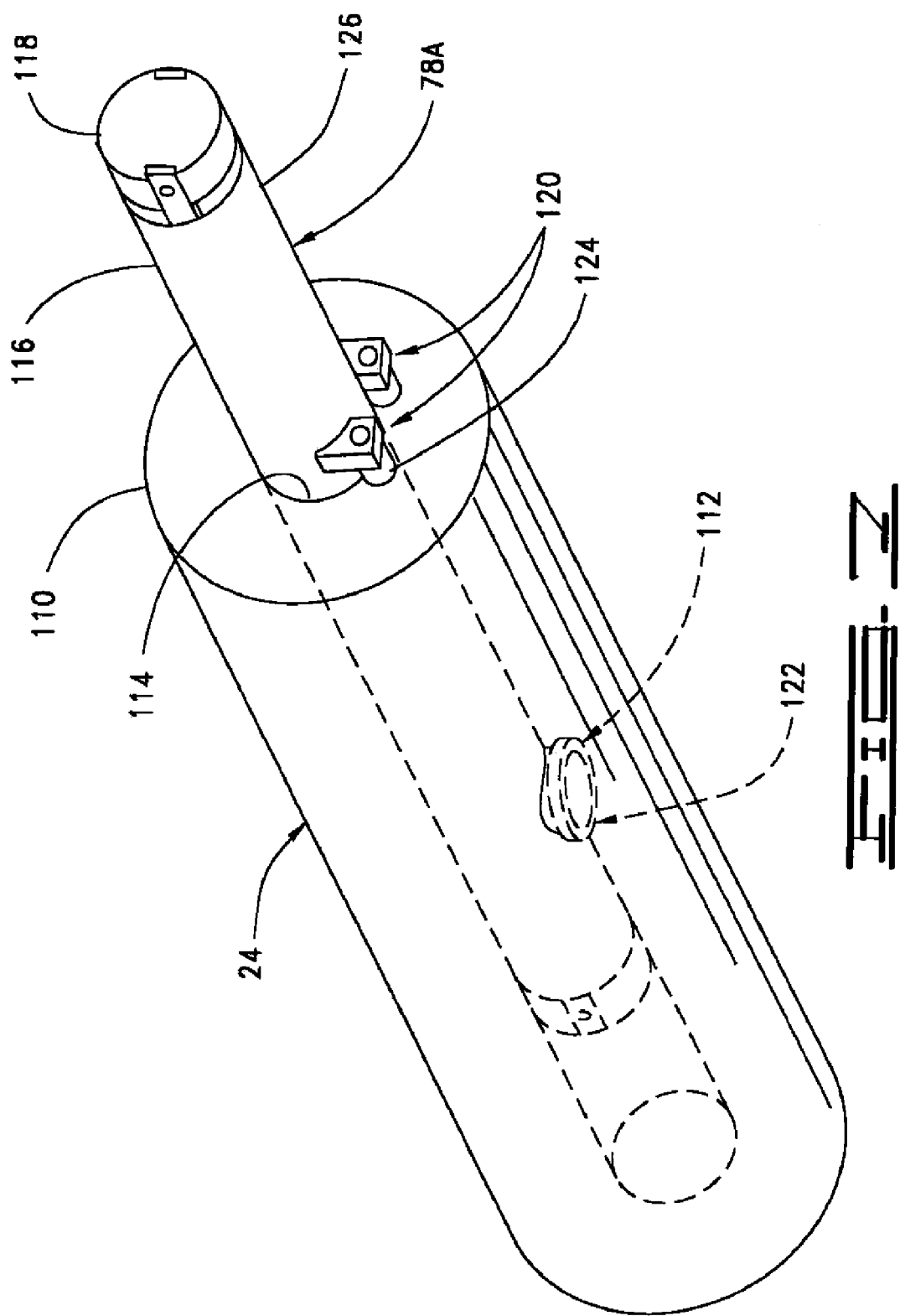
FIG. 7 is a perspective view of an alternative boring machine used to create the cavity shown in FIG. 5.

Turning now to FIG. 7 there is shown therein an alternative apparatus for cutting an inner surface of an opening formed within an object. The apparatus 78A of FIG. 7 is shown within the upset end 110 of drill stem component section 24 and within the cylindrical inner diameter of the drill stem component section 24. Drill stem component section 24 is used herein for illustration purposes only. One skilled in the art will appreciate that apparatus 78A may be used to cut a counterbore 112 or groove (not shown) in the opening of many different objects.

The apparatus 78A shown in FIG. 7 may comprise a housing 116, a hydraulic connection assembly 118, magnet mounts 120, and cutter assembly 122. The housing 116 shown in FIG. 7 is generally cylindrical and constructed to fit within the cylindrical bore formed in the drill stem component section 24. It will be appreciated that the housing 116 may be constructed to have many alternative shapes and sizes to allow the apparatus 78A to fit within an opening formed within various drilling components. Magnet mounts 120 may comprise at least one magnet 124. The magnets 124 are used to secure the apparatus 78A to the drill stem component and reduce axial movement of the device relative to the drill stem component 24 during the cutting operation. The magnets 124 also function to set the distance inside the component at which the cutting member 136 operates. The hydraulic assembly 118 is supported near the first end 126 of the apparatus 78A and constructed for connection to hydraulic hoses (not shown) that provide hydraulic fluid to drive operation of the boring machine.

Figure 8:
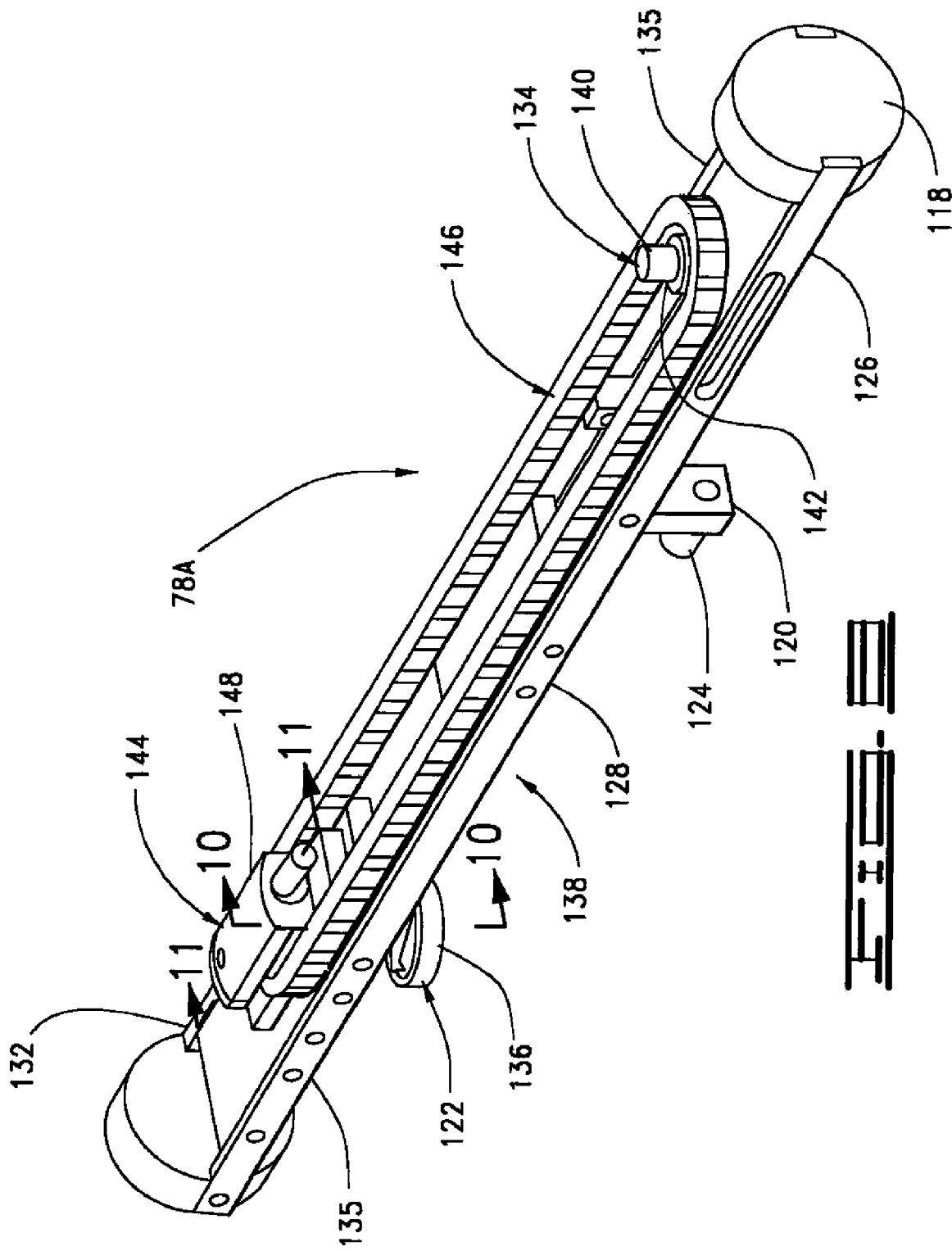
FIG. 8 is a perspective view of the internal boring machine of FIG. 7 having the outer housing removed.

Turning now to FIG. 8 the apparatus 78A is shown with housing 116 (FIG. 7) removed to expose a portable frame 128 having a first end 126 and a second end 132. The frame 128 supports the hydraulic assembly 118, cutter assembly 122, magnet mounts 120, and a drive system 134 supported proximate to the first end of the frame.

The frame 128 is generally elongate and comprises a set of parallel rails 135 constructed from steel or some other material capable of withstanding the harsh environment encountered when cutting a counterbore in the inner diameter of the drill stem component section.

The drive system 134 is supported proximate to the first end 126 of the frame and is adapted to drive operation of a cutting member 136 mounted on a first side 138 of the frame 128. The drive system 134 may comprise a drive sprocket 140 having an internal shaft for engagement by a portable drill or other rotary drive input device. Alternatively, the drive system 134 may comprise a hydraulic or pneumatic motor operable in response to hydraulic or air pressure supplied through the connector 188. The drive system 134 drives operation of a means for transmitting drive power from the drive system to the cutting member to drive operation of the cutting member 136. In the embodiment of FIG. 8, the drive sprocket 140 is used to engage a drive chain 142 that is driven in response to rotation of the drive sprocket 140. The drive chain 142, in turn, drives operation of the cutter assembly 122 in a yet to be described manner.

Figure 10:
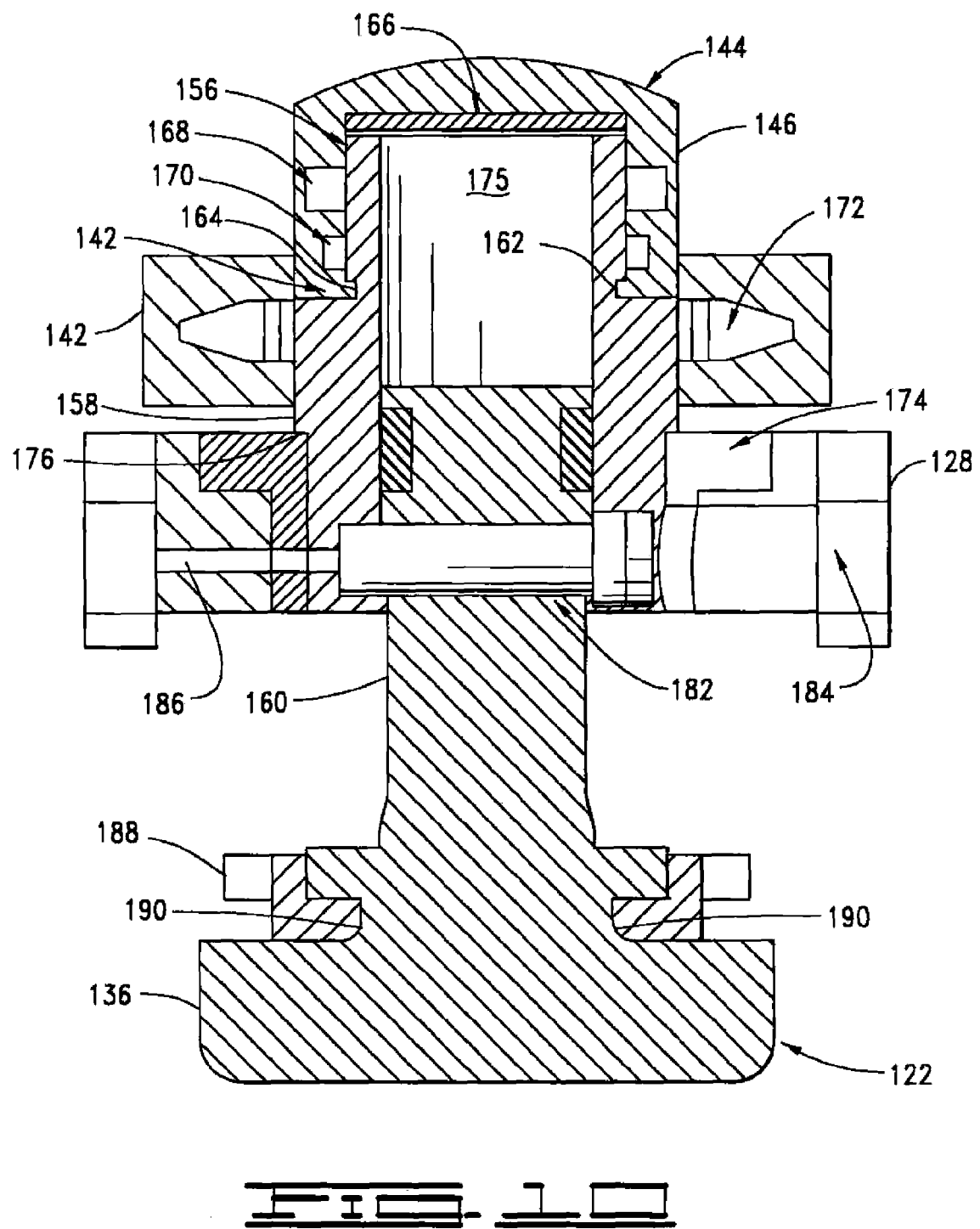
FIG. 10 is a cross-sectional view of the internal boring machine of FIG. 6 taken along line 10-10 of FIG. 7.

Continuing with FIG. 8, the apparatus 78A further comprises a stabilizing member 144 mounted on a second side 146 of the frame 128. The stabilizing member 144 is adapted to secure the apparatus 78A within the internal bore or opening (FIG. 7) during operation of the cutting member 136. The stabilizing member 144 shown in FIG. 8 comprises a housing 148 adapted to enclose a second sprocket 172 (FIG. 10). The housing 148 may be constructed to abut the inner surface of the internal opening of the object. The housing 148 shown in FIG. 8 has a generally curved top formed to abut the inner surface of the housing 110 which abuts the cylindrical bore as the cutting member 136 is actuated. It will be appreciated that the stabilizing member 144 may also comprise any device adapted to secure the internal boring machine of the present invention within the opening. By way of example, the stabilizing member may comprise a clamp (not shown) affixed to the outer diameter of the tubular member and the internal boring machine or magnets 124.

Figure 9:
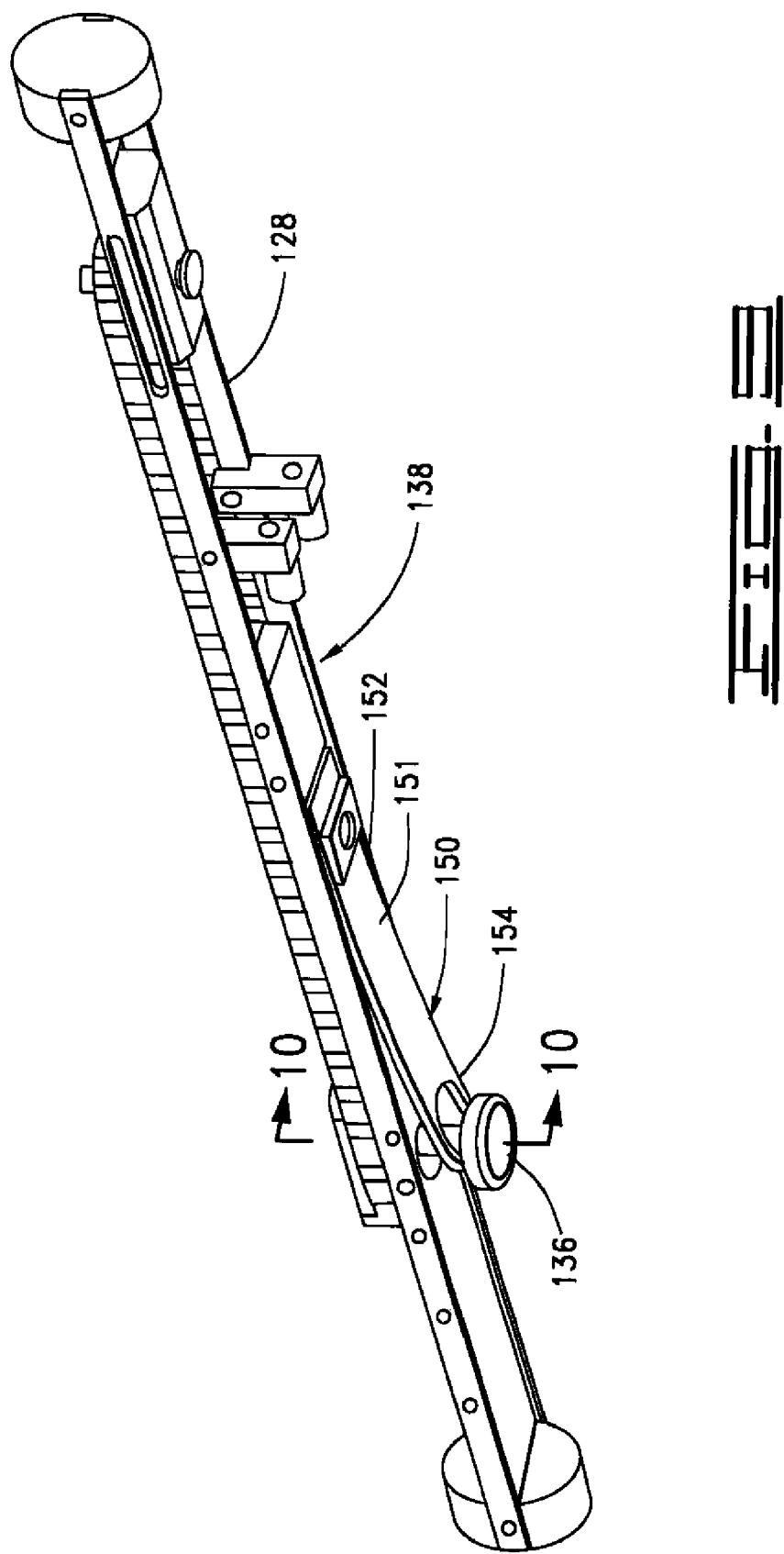
FIG. 9 is a perspective view of the underside of the internal boring machine shown in FIG. 7.

Turning now to FIG. 9 the apparatus 78A of FIG. 8 is shown from below the first side 138 of the frame 128. In FIG. 9 the cutting assembly 122 is shown having a means 150 for retracting the extendable cutting member 136 into the frame 128. The means 150 may comprise a cantilevered spring 151 operatively connected to the frame 128 at a first end 152 and to the cutting member 136 at a second end 154. The cantilevered spring 151 is connected to both the frame 128 and the cutting member 136 so that, when a yet to be described means for actuating the cutting member (FIG. 10) is deactivated, the cutting member retracts into housing 148 under force of the spring 151. One skilled in the art will appreciate that alternative devices may be used to retract the cutting member 136 into the frame 128 without departing from the spirit of the present invention. For example, the actuating device 156 may be constructed to retract the cutting member 136 using hydraulic, electric or pneumatic devices.

With reference now to FIG. 10, the apparatus 78A of FIG. 8 is shown in cross-section along line 10-10 (FIG. 8). The view of apparatus 78A shown in FIG. 10 illustrates the stabilizing member 144 and the cutting assembly 122 in cross-section. The stabilizing member 144 comprises housing 148 and an actuating device 156 supported at the second end of the frame 128. The actuating device 156 may comprise a cylinder assembly, a solenoid, a ball screw, or a power thread. The actuating device may comprise an actuated member 160 operatively connected to the cutting member 136. The cylinder assembly shown, for purposes of illustration, in FIG. 10 has a cylinder 158 and the actuated member comprising a piston 160 extendable from the cylinder. The cylinder 158 and housing 148 are operatively connected by a circumferential lip 162 and circumferential groove 164 so that cylinder 158 is rotatable within the housing 148. A thrust bearing 166 is disposed between housing 148 and cylinder 158 to bear the thrust and rotational load placed upon the housing 148 when the piston 160 is extended and the cylinder 158 rotated. A seal 168 is disposed about the inside of housing 148 and around the outside of cylinder housing 158 to seal the inside of housing 148. The seal 168 allows cylinder 158 to rotate within the stabilizing member's 144 housing 148 and seals the thrust bearing 166. A bearing 170 is supported within the housing 148 and provides a bearing surface for rotation of the cylinder 158 relative to the housing 148.

Continuing with FIG. 10, a sprocket 172 may be fixed to the outside of the cylinder 158 for rotation therewith. The sprocket 172 may comprise a roller chain sprocket adapted to engage chain 142. Sprocket 172 rotates in response to the transmission of energy from the drive assembly 134 (FIG. 8) and sprocket 140 (FIG. 8) via chain 142. Rotation of sprocket 172 causes rotation of both the cylinder 158 and cutting member 136. The cylinder 158 passes through a flange bearing 174 supported by frame 128. Flange bearing 174 provides a bearing surface for rotation of the cylinder 158 relative to the frame 128. A lip 176 formed on cylinder 158 prevents axial movement of the cylinder 158 relative to the frame 128 as the cylinder is rotated.

The cutting member 136 comprises piston 160 supported within the cylinder housing 158 and extendable in response to an increase of hydraulic pressure within chamber 175. It will be appreciated by one skilled in the art that pneumatic pressure may be used to drive operation of the cutting assembly 122 without departing from the spirit of the invention. A reciprocating o-ring seal 180 may be disposed around piston 160 to seal chamber 175. A torque pin 182 may be used in the embodiment of the present invention to secure the piston 160 within the cylinder 158 for rotation therewith. The torque pin 182 may be inserted into the piston through a torque pin access hole 184 formed in the frame 128. A punch hole 186 provides access for removal of the torque pin through the access hole 184. Use of torque pin 182 allows for the exchange of cutting assemblies 122 having a variety of characteristics and configurations.

Cutting member 136 may be supported at the external end of piston 160 and may be integrally formed with the piston. The cutting member 136 may comprise a circular carbide drill bit 186 adapted to cut the counterbore 112 shown in FIG. 7. The cutting member 136 is constructed to support a spring bushing 188 that is operatively connectable with cantilevered spring 151 (FIG. 9). Spring bushing 188 is supported within a circumferential bushing groove 190 and allows the cutting member 136 to rotate while remaining under tension from spring 151.

Turning now to FIG. 11, the cutting assembly 122 of FIG. 10 is shown in longitudinal section. In FIG. 11 the cutting assembly 122 has been retracted into the cylinder housing 158 under the force cantilevered spring 151 (FIG. 9). A ⅛" pressure fitting 192 is shown connected to housing 148 and is used to supply hydraulic fluid to the cylinder 158 through the housing of the stabilizing member 144. Passage 194 formed in housing 148 is used to deliver hydraulic fluid from the pressure fitting 192 into the chamber 175 of cylinder 158. The housing 148 may be connected to the frame 128 with bolts (not shown) with mounts 198 and 200. The bolts extend through mounts 198, 200 and the frame 128.

An increase in hydraulic pressure within chamber 175 pushes down on piston head 196 to extend cutting member 136 from the frame 128. As the piston 160 and cutting member 136 are pushed down, the torque pin 182 travels in a slot 202 formed in the piston 160 to allow the piston to move downward while the piston and cutting member 136 are rotated in response to rotation of the cylinder 158 and sprocket 172. Once counterbore 112 has been cut into the cylindrical bore, the flow of hydraulic fluid to the cylinder 158 is stopped and the piston 160 may be retracted into the cylinder chamber 175 under the force of the cantilevered spring 151 as shown in FIG. 11.

In operation the boring tool 78A is inserted into the opening 34 until the magnets 124 abut the edge of the object 24. Once properly positioned and oriented within the opening 34, hydraulic fluid may be pumped into the apparatus 78A to activate the drive system 134 supported proximate to the first end 126 of the frame 128. The drive system 134, in turn, generates rotational energy that is transmitted via sprockets 140 and 172 and drive chain 142 to the cutting assembly 122. The cutting assembly 122 is constructed so that the rotational energy generated by the drive system 134 is used to drive rotation of the cutting member 136.

Hydraulic fluid is supplied to the apparatus 78A through hydraulic connection assembly 118 along pressure fitting 192 and into the housing 148 of the stabilizing member 144. The fluid is pumped into the cylinder chamber 175 to extend the cutting member 136 from the first side 138 of the frame 128. As the cutting member 136 is extended to engage the inner surface of the cylindrical bore the stabilizing member 144 is pushed upward into the opposing side of the cylindrical bore to stabilize the apparatus 78A within the inner diameter of the cylindrical bore during operation of the cutting member 136.

Once the counterbore has been cut into the cylindrical bore, the flow of hydraulic fluid to the cylinder 158 is stopped and the cutting member 136 is allowed to retract under the force of the cantilevered spring 151. After the cutting member 136 retracted into the cylinder 158, rotation of the cylinder is stopped and the boring tool 78A may be removed from the cylindrical bore.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that within the scope of the appended claims, the invention may be practiced otherwise than as specifically illustrated and described.

What is claimed is:

1. An apparatus for cutting an inner surface of an opening formed within an object and accessible from outside the object, the apparatus comprising:
   a portable frame having a first end and a second end;
   a drive system supported by the first end of the frame;
   a cutting member, having an axis of rotation, mounted on a first side of the frame;
   a means for transmitting drive power from the drive system to the cutting member to drive operation of the cutting member;
   wherein only the cutting member is movable along the axis of rotation of the cutting member; and
   a stabilizing member mounted on the frame and formed to match the opening in shape or diameter, sized to fit within the opening, and configured to engage an outer surface of the object to secure the apparatus during operation of the cutting member.

2. The apparatus of claim 1 further comprising a means for extending and retracting the cutting member relative to the frame.

3. The apparatus of claim 1 further comprising an actuating device supported by the frame and adapted to extend the cutting member from the first side of the frame.

4. The apparatus of claim 1 wherein the cutting member is disposed proximate to the second end of the frame.

5. The apparatus of claim 1 further comprising an input power device and wherein the drive system comprises a means for receiving an input power from the input power device.

6. The apparatus of claim 1 further comprising an actuating device adapted to extend the cutting member from the frame.

7. The apparatus of claim 6 wherein the actuating device comprises an actuated member operatively connected to the cutting member.

8. The apparatus of claim 7 wherein the actuating device comprises a cylinder and wherein the actuated member comprises a piston operatively engaging the cylinder.

9. A cutting apparatus comprising:
   a frame comprising a longitudinal axis, a first end and a second end;
   a drive system supported by the first end of the frame;
   an actuating device supported at the second end of the frame;
   a cutting member having an axis of rotation and operatively connected to the actuating device and movable from a first side of the frame by operation of the actuating device;
   wherein only the cutting member is movable relative to the frame along the axis of rotation of the cutting member; and
   a means for transmitting drive power from the drive system to the cutting member to drive operation of the cutting member; and
   a stabilizing member connected to the frame and configured to engage an outer surface of an object to be cut to secure the apparatus during operation of the actuating device and movement of the cutting member.

10. The cutting apparatus of claim 9 wherein the stabilizing member further comprises a housing disposed about the frame; wherein the housing is configured to fit within an opening formed in an object to be cut.

11. The cutting apparatus of claim 9 wherein the stabilizing member further comprises a movable member extendable from the frame to stabilize the apparatus during operation of the cutting member.

12. The cutting apparatus of claim 9 wherein the cutting member is extendable from the first side of the frame.

13. The cutting apparatus of claim 12 further comprising a means for retracting the cutting member into the frame.

14. The cutting apparatus of claim 13 wherein the means for retracting the extendable member is connected to the frame at a first end and the extendable cutting member at a second end.

15. The cutting apparatus of claim 9 wherein the actuating device comprises an actuated member operatively connected to the cutting member.

16. The cutting apparatus of claim 15 wherein the actuating device comprises a cylinder and wherein the actuated member comprises a piston operatively engaging the cylinder.

17. The cutting apparatus of claim 9 wherein the cutting member is disposed proximate to the second end of the frame.

18. The cutting apparatus of claim 9 further comprising an input power device and wherein the drive system is adapted to receive an input power from the input power device.

19. An apparatus for cutting a counterbore in an inner wall of an object having an opening accessible from outside the object, the apparatus comprising
   a frame having a longitudinal axis, a first end and a second end;
   a drive system supported by the first end of the frame;
   an actuating device supported at the second end of the frame;
   a cutting member having an axis of rotation supported by the frame and movable along the axis of rotation and relative to a first side of the frame by operation of the actuating device;
   wherein only the cutting member is movable relative to the frame by the actuating device;
   a means for transmitting drive power from the drive system to the cutting member to drive operation of the extendable cutting member; and
   a means formed to match the opening in shape or diameter and sized to fit within the opening for stabilizing the apparatus within the opening of the object by engaging an outside surface of the object during operation of the cutting member supported on the frame.

20. The apparatus of claim 19 wherein the means for stabilizing further comprises a housing disposed about the frame; wherein the housing is configured to fit within an opening formed in an object to be cut.

21. The apparatus of claim 19 wherein the stabilizing member further comprises a movable member extendable from a second side of the frame to stabilize the apparatus within the opening of the object during movement of the cutting member.

22. The apparatus of claim 21 wherein the stabilizing member further comprises a cylinder and wherein the movable member comprises a piston extendable from the housing to stabilize the apparatus during movement of the cutting member.

23. The apparatus of claim 19 wherein the cutting member is extendable from the frame.

24. The apparatus of claim 23 further comprising a means for retracting the cutting member into the frame.

25. The apparatus of claim 24 wherein the means for retracting the cutting member is connected to both the frame and the cutting member.

26. The apparatus of claim 19 wherein the actuating device comprises an actuated member operatively connected to the cutting member.

27. The apparatus of claim 26 wherein the actuating device comprises a cylinder and wherein the actuated member comprises a piston operatively engaging the cylinder.

28. The apparatus of claim 19 wherein the cutting member is disposed proximate to the second end of the frame.

29. The apparatus of claim 19 wherein the drive system comprises a means for receiving an input power from an input power apparatus.

\* \* \* \* \*